C. S. REGENOLD.
PERMUTATION VALVE.
APPLICATION FILED AUG. 14, 1919.
1,365,543.
Patented Jan. 11, 1921.
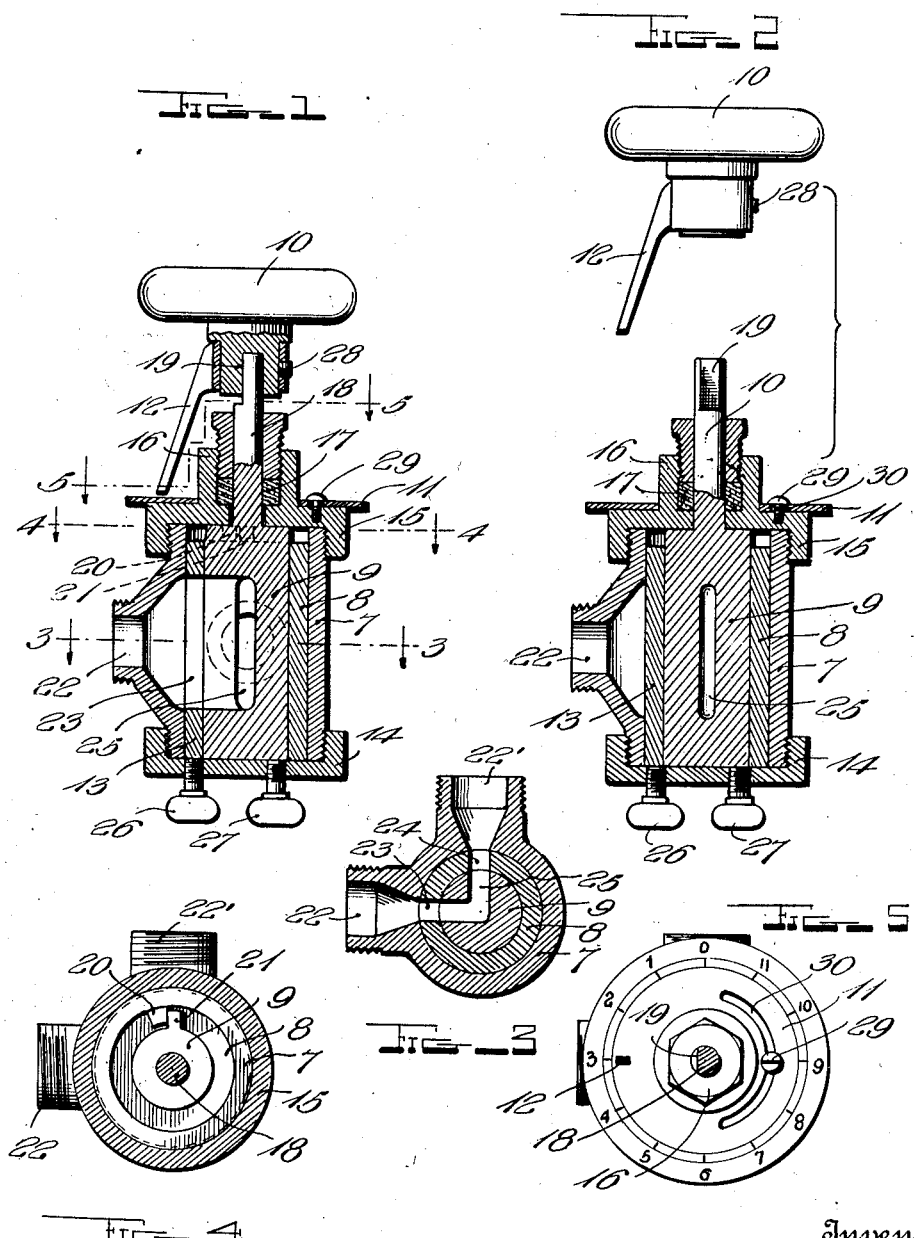

UNITED STATES PATENT OFFICE.

CHARLES S. REGENOLD, OF MEMPHIS, TENNESSEE.

PERMUTATION-VALVE.

1,365,543.  Specification of Letters Patent.  Patented Jan. 11, 1921.

Application filed August 14, 1919. Serial No. 317,502.

*To all whom it may concern:*

Be it known that I, CHARLES S. REGENOLD, a citizen of the United States, residing at Memphis, in the county of Shelby and State of Tennessee, have invented certain new and useful Improvements in Permutation-Valves; and I do declare the following to be a full, clear, and exact description of the invention, such as will enable others skilled in the art to which it appertains to make and use the same.

This invention relates to valves, and it relates more specifically to an improved permutation valve.

One object of this invention is to generally improve upon devices of this character by providing an exceedingly simple, compact, convenient, practical and effective structure at a comparatively slight cost.

Other objects and advantages may become apparent to persons who read the following details of description in connection with the accompanying drawings, in which:—

Figure 1 is a sectional view, the section being taken through the plane of the common axis of the rotary elements, the openings through these elements being in registry or communication with the inlet and outlet of the casing so that fluid can pass therethrough.

Fig. 2 is a sectional view somewhat similar to Fig. 1, but the handle or actuating element being disengaged from the valve stem, and the openings of the rotary elements being out of registry with the inlet and outlet of the casing.

Fig. 3 is a sectional view along the line 3—3 of Fig. 1.

Fig. 4 is a sectional view along the line 4—4 of Fig. 1.

Fig. 5 is a sectional view along the line 5—5 of Fig. 1.

Referring to these drawings in detail, in which similar reference characters correspond with similar parts throughout the several views, the device comprises a casing 7, a rotary tubular element 8, a rotary plug 9, an actuating element 10, a dial 11, an index 12, and locking means which will hereinafter be described in detail.

The casing may be of any appropriate construction, but in the present disclosure it comprises a hollow body 13 having its ends closed by means of caps 14 and 15 which may be secured in place by screw threads as indicated. The cap 15 is provided with a stuffing box 16 in which a gland 17 is seated for securing the packing in place around a valve stem 18 which may be an integral part of the rotary plug 9, and the outer end of this valve stem is non-cylindrical being preferably slabbed at 19, so that the handle or actuating member 10 can be fitted thereon only in one position with relation to the valve stem. The purpose of thus connecting the actuating member 10 with the valve stem is to permit the actuating member to be removed from the stem and subsequently replaced in the correct position.

The tubular element 8 is somewhat shorter than the plug 9 with the exception of an end extension or axially extending lug 20 which is in the path of a radial extension or shoulder 21 of the plug 9, so that the tubular element 8 may be rotated by the plug 9, as more fully explained hereinafter.

The casing 7 is provided with an inlet and an outlet, as indicated at 22 and 22'. It is obvious, however, that either of these openings 22 and 22' may constitute the inlet while the other constitutes the outlet. The tubular member 8 is likewise provided with an inlet and an outlet, as indicated at 23 and 24, and these openings will hereinafter be referred to as ports to distinguish them from the inlet and outlet and from a passage 25 which is formed through the plug 9 and is adapted to register with said ports, inlet and outlet, as clearly shown in Fig. 3.

In order that the rotary elements 8 and 9 may be positively secured with their ports and passage in the registering position illustrated in Fig. 3, thumb screws 26 and 27 are provided in the cap or bottom 14 of the casing. These thumb screws when tightened, bear respectively against the outer and inner rotary elements 8 and 9 at points eccentric to their axis of rotation.

The pointer or index 12 may be adjustably secured on the actuating element 10 by means of a set screw 28, and the combination may be changed by loosening the screw 28, turning the index to a predetermined number or graduation on the dial 11, and then tightening the set screw 28. Moreover, the combination can be changed by shifting the dial after loosening a screw 29 which is engaged with the cap 15 and extends through a slot 30 in the annular plate or dial 11, as indicated in Figs. 1 and 5.

It should be understood that the main purpose of a device of this character is to prevent the opening of the valve by an unauthorized person, and it is particularly useful in connection with engines in which liquid fuel is used. By preventing an unauthorized person feeding the fuel to the engine he is prevented from starting the engine so as to steal the automobile or other machine comprising the engine.

Therefore, in operating this device, the owner or operator thereof must have it set to a certain combination which he knows and which is not known to an unauthorized person. Now, assuming that the valve is open, as shown in Fig. 1, and the operator desires to close the same and leave his machine or engine under protection by this commutation valve, he turns the handle or actuating member 10 until one or both of the openings in the rotary elements 8 and 9 are out of registry of communication with the inlet 22 or outlet 22'. He then removes the actuating member 10 and index 12 and hides or keeps it until he desires to open the valve. It will be seen that it is difficult to actuate the valve without the use of an actuating member, for the rotary elements 8 and 9 are essentially fitted snugly together to prevent leakage, but even if an unauthorized person has a duplicate actuating member 10, and can turn the valve stem therewith, he will experience great difficulty and expense of time in trying to bring the openings of the rotary elements in registry with one another and with the inlet and outlet of the casing 7. However, when a person who knows the combination desires to open the valve and has the actuating element 10, he places the same on the valve stem and turns the latter one or more times around and then stops the index 12 at the first number or graduation of the combination. He then tightens the thumb screw 26 so as to lock the tubular element 8 in the proper position, and now reverses the direction of movement of the rotary plug 9 so that the shoulder 21 leaves the lug 20 and the plug rotates with relation to the tubular member 8 until the passage 25 of the index 12 reaches the second number or graduation of the combination on the dial 11, and thus indicates that the passage 25 is now in registry with the ports 23 and 24. The thumb screw 27 is now tightened against the plug 9, and the valve is thus held in its open position. It should be understood that the screws 26 and 27 should be loosened before attempting to close the valve, and they may be tightened after the valve is closed so as to render the opening of the valve by an unauthorized person more difficult.

Although I have described this embodiment of my invention very specifically, it is not intended to limit this invention to these exact details of construction and arrangement, but changes may be made within the scope of the inventive idea as described and claimed herein.

What I claim as my invention is:

In a permutation valve, the combination of a casing including a cylindrical inner surface having radial ports therethrough, said casing also including a head having a central aperture therethrough, and an eccentrically apertured head, a radially apertured hollow cylinder rotatably fitted against said cylindrical surface and against one of said heads and being provided with radial ports and an axially extending lug, a cylindrical plug rotatably fitted in said hollow cylinder and against said heads and provided with radial ports and a radially extending shoulder, said shoulder being in position to engage with said lug for turning said cylinder, said plug being provided with an actuating stem which extends through the centrally apertured head, said eccentrically apertured head being provided with set-screws threaded in its apertures and operable to engage with said cylinder and said plug respectively for holding each of these members in different positions relative to said casing, a handle removably fitted on said stem, and provided with an indicating pointer, and an indicating dial mounted for arcuate adjustment on the centrally apertured head and in position to register with said pointer.

In testimony whereof I have hereunto set my hand.

CHARLES S. REGENOLD.